United States Patent
Brown et al.

(10) Patent No.: US 6,701,195 B2
(45) Date of Patent: Mar. 2, 2004

(54) SENSOR PREDICTION SYSTEM UTILIZING CASE BASED REASONING

(75) Inventors: Michael Brown, Berlin (DE); Lueder Heidemann, Erlangen (DE); Karsten Schneider, Erlangen (DE)

(73) Assignee: Siemens Aktiengesellschaft (DE)

( * ) Notice: Subject to any disclaimer, the term of this patent is extended or adjusted under 35 U.S.C. 154(b) by 152 days.

(21) Appl. No.: 09/883,051

(22) Filed: Jun. 15, 2001

(65) Prior Publication Data

US 2002/0010517 A1 Jan. 24, 2002

Related U.S. Application Data (63) Continuation of application No. PCT/EP99/09927, filed on Dec. 14, 1999.

(30) Foreign Application Priority Data

Dec. 17, 1998 (EP) .............................................. 98124063

(51) Int. Cl.⁷ .............................................. G05B 13/02
(52) U.S. Cl. ............................ 700/44; 700/28; 700/48; 700/45; 706/47; 706/48
(58) Field of Search ................................ 700/28, 44–45, 700/29, 47, 48, 49; 706/47, 48, 45, 903, 906

(56) References Cited

U.S. PATENT DOCUMENTS

| | | | |
|---|---|---|---|
| 5,519,605 A | * 5/1996 | Cawlfield | 700/31 |
| 5,574,638 A | 11/1996 | Lu | 700/45 |
| 5,586,221 A | * 12/1996 | Isik et al. | 706/23 |
| 5,587,897 A | 12/1996 | Iida | 700/28 |
| 5,973,662 A | * 10/1999 | Singers et al. | 345/418 |
| 6,002,839 A | * 12/1999 | Keeler et al. | 706/23 |
| 6,144,952 A | * 11/2000 | Keeler et al. | 706/21 |
| 6,418,425 B1 | * 7/2002 | Maeda et al. | 706/47 |
| 6,453,308 B1 | * 9/2002 | Zhao et al. | 706/21 |

FOREIGN PATENT DOCUMENTS

| | | |
|---|---|---|
| EP | 0477490 | 4/1992 |
| EP | 0529307 | 3/1993 |
| EP | 0582069 | 2/1994 |
| EP | 0745916 | 12/1996 |
| WO | 9321587 | 10/1993 |

* cited by examiner

Primary Examiner—Ramesh Patel
Assistant Examiner—Ronald D Hartman, Jr.
(74) Attorney, Agent, or Firm—Baker Botts LLP (57) ABSTRACT

A system of case-based reasoning for sensor prediction in a technical process, especially in a cement kiln, method and apparatus therefore, and wherein the system provides accurate predictions of the cement kiln behavior for a limited period into the future. The invention utilizes a method of case-base-reasoning (CBR) for the task of sensor value prediction. An apparatus for implementing the method is characterized by a database (100) in which the relevant time interval data are stored, a test generator (101) and an optimisation unit (102–104) for the selection and optimisation of the time interval data.

18 Claims, 8 Drawing Sheets

SENSOR PREDICTION SYSTEM UTILIZING CASE BASED REASONING

RELATED APPLICATION

This application is a continuation of PCT/EP99/09927 filed Dec. 14, 1999 claiming priority from Germany patent application number 981 24 063.3 filed on Dec. 17, 1998, which International application was published by the International bureau in German on Jun. 22, 2000, from which priority is claimed.

BACKGROUND OF THE INVENTION

The invention concerns a method and an apparatus for a case-based reasoning (CBR) system, especially developed for the task of sensor value prediction within a cement kiln control system.

Providing accurate predictions of the cement kiln behavior for a limited period into the future, e.g. approx. 1 hour, can enable a human controller of the cement kiln to make more informed decisions, as well as providing a basis for more automated control within a cement making plant. The invention provides an alternative to existing technologies, such as rule-based control systems, that require prohibitively high installation and maintenance costs.

As part of an existing system which provides extensive support facilities for the control of a cement production plant, all sensor data for the cement kiln and related machinery are routinely stored within a database. The data is represented as time-stamped floating-point numbers.

As an example of the amount of data that needs to be processed in a sensor-based technical process; the sensor sampling rate inside a cement kiln is typically once a minute or more frequent, there are typically over 400 sensors in the cement kiln and related apparatus, and the data archive can contain in access of 1 year's storage of data. This means that the raw data can be of the order of $10^8 \rightarrow 10^9$ floating point numbers. Therefore, any automated method that exploits this data to perform sensor value prediction needs to be able to cope with a large amount of unstructured sensor data.

The invention is most suited to technical processes that involve human intervention. Typically, the cement kiln in an active cement production plant is monitored and controlled by a human expert, roughly every 0–15 minutes. Due to the high numbers of sensors involved, it is difficult for a human expert to get an adequate over-view of the status of the kiln and, therefore, there is a need for automated support in the analysis task. In particular, when exceptional behavior occurs, e.g. sensor values going out of predefined ranges, or an abrupt change in sensor values, support is required to determine both what the likely/possible consequences are of the exceptional behavior and what corrective actions the human expert should carry out. In order to support this, an automated system is required that can accurately project the values of all sensors for a significant time period, e.g. >1 hour, into the future.

Nevertheless, the user may, at any one time, dynamically select a reduced subset of signature sensors that are considered to contain the most salient information to characterize the current state of the technical process. Hence, the automated prediction system must be flexible enough to react to this dynamic user selection.

The sensor data collected for a technical process can often be problematic. For example, due to the relative close proximity of many of the sensors within the cement kiln, there is significant redundancy in the information that is represented in the data stored for different sensors. Some level of random noise in the recorded data must also be tolerated. Perhaps more significantly, it cannot be guaranteed that all values for all sensors are always available. There are some periods of time where no sensor values are recorded, e.g. due to a failure in the database. More commonly, missing values will occur for a single sensor for a period of time, e.g. due to a failure in the sensor itself. These imperfections in the raw data must be tolerated by the prediction system.

The final complexity of the problem is that each application of the prediction system to a new technical process or feature thereof will require some recalibration. For example, each cement kiln has its own characteristics. Indeed, the set of sensors contained is likely to change from cement kiln to cement kiln. Hence, the sensor-value prediction system must be newly adapted to each cement plant in which it is installed; a costly procedure for any technique that is model-based. Furthermore, as for many other types of manufacturing apparatus, a single individual cement kiln is subject to aging. In other words, the behavioral characteristics of a single cement kiln are known to drift gradually over time. Hence, any behavioral model developed for an individual cement kiln must be periodically refitted to adapt to these changes; which is also a potentially costly maintenance problem.

Model-based techniques, in conjunction with Artificial Intelligence technology, such as Neural Networks and Fuzzy Logic, represent the state-of-the-art for automated control systems for cement plants. The main problem with this type of approach is that the general model of the technical system embedded in the prediction system must be adapted and parameterized by highly-skilled experts in order to be applied within a particular cement plant. In addition, due to drift in the behavior of a single cement kiln over time, the model needs to be periodically maintained, e.g. re-parameterized, so as to remain reliable over time. The disadvantages of high application and maintenance costs are likely to be encountered by an model-based technique.

A general alternative to hand-constructed and adapted models are machine learning techniques that can be trained on existing data. The most popular of such machine learning techniques that can be trained on existing data. The most popular of such machine learning approaches are artificial neural networks that have been successfully employed to perform diagnostic tasks based on sensor data in similar application fields to that of this invention. Nevertheless, some fundamental problems remain with artificial neural networks that serious prohibit their use for the cement kiln control application; including:

a Ability to deal with missing data: Some techniques exist for generation of missing sensor values, such as linear interporlation. Nevertheless, the degree of noise in the application data may hinder the training of artificial neural networks. Furthermore, it is not clear how an artificial neural network can deal with the dynamic selection of a subset of relevant sensors.

b Interpretation of results: The basis behind the predicted by a human controller results generated by an artificial neural network are not easily open to human inspection by a human expert. Hence, a control expert is unable to assess the reliability of the prediction. For this reason, neural networks are better suited to completely automated applications where human. inspection of the predictions is not required.

c Ability to predict exceptional behavior: A trained artificial neural network is generally good at recognizing the general trends that frequently re-occur within the training data but poor at reproducing rarely occurring, exceptional circumstances. Nevertheless, rare behavior is often the most important to predict with respect to the state of the art, the objects of the invention are; a new method and a new apparatus for process optimisation, especially in a cement kiln, based on the data produced by sensors.

EP 0 582 069 A2 discloses a method for control of a process having manipulated and controlled variables with the controlled variables having target values which depend on the adjusted value of said manipulated variables. The process is controlled in real time through a process controller under the operation of a computer. The method of control comprising the steps of establishing a first performance index to compute the absolute value of the deviation for each control variable in the process from its target value over a specified time horizon; generating a first linear programming model the solution of which minimizes said first performance index; solving the first linear programming model; establishing a second performance index to compute the absolute change in the value of each manipulated variable from its previous value for each control variable over a specified time interval; generating a second linear programming model the solution of which minimizes said second performance index; incorporating at least one dynamic constraint in said second linear programming model computed from the solution of said first linear programming model and being equal to a value above zero and of no greater than the value of the solution of said first linear programming model plus a predetermined amount; solving said second linear programming model with said dynamic constraint; and adjusting the manipulated variables in response to the solution of said second linear programming model to drive said controlled variables toward the target values.

EP 0 745 916 A1 discloses a method for controlling a technical process, whereby the process variables a measured as data sets and compared with stored data sets and/or computed for getting control parameters for process optimization. The data sets are stored in memories and such cases of data sets are chosen which fulfill a goal. The cases are stored in an m-dimensional space as a polytope whereby only such data sets which are laying on the surface of a polytope are used for getting control parameters.

EP 0 529 397 A1 discloses a method for controlling the operation of liquefied neutral gas process which utilizes gas turbine-driven refrigeration compressors. The method comprises the steps of determining the ambient air temperature at the location of the liquefaction process at a given time; determining the optimum operation conditions of the liquefaction process including the set point of the feedback control loop at the given time, and operating the liquefaction process at the optimum operating conditions including the set point of the feedback control loop; predicting the ambient air temperature at the future time; determining new optimum operating conditions of the liquefaction process including a new set point of the feedback control loop at the future time, and changing the optimum operating conditions to the new optimum operating conditions including changing the set point to the new set point; operating the liquefaction process and the new optimum operating conditions including the new set point; and repeating the aforementioned steps at a time interval defined by the time difference between the given time and the future time.

EP 0 477 490 A2 discloses an approximate reasoning apparatus where data representing a relationship between factors and conclusions which have occurred is accumulated in a memory, thereby making it possible to revise a knowledge base, which has already been established, e.g. at the designs stage, using the accumulated data. Since the knowledge base is revised using data representing the relationships between factors and conclusions which actually have occurred, more accurate approximate reasoning becomes possible. In addition, since revision of the knowledge base is performed automatically, maintenance of a knowledge base is possible without the aid of experts.

U.S. Pat. No. 5,574,638 discloses a method which provides robust control of a process, comprising the steps of calculating a set of scale factors for the manipulated variables and the process variables. The controller is initialized with the set of scale factors, the scale factors determining the relative importance to the process of the manipulated variables and the process variables. The robust control is initialized to have predetermined constraints of the manipulated variables and the control variables. The present values of the manipulated variables and the controlled variables are then obtained. New values are calculated for the controlled variables for a predetermined number of points in the future such that the values of the controlled variables are within the predetermined range thereby obtaining an optimum robustness of the resultant controller.

WO93/21587 discloses a machine learning system implementing a case-based-like reasoning system with a relational data base. A relational data base may comprise a set of records and a set of fields, each field in each record may comprise a value, such as numeric value. Cases in a case-based reasoning system may be represented by records like those in the relational data base, and a feature of a case maybe represented by the fields of the record. A case in the case base may be represented by records in the relational data base while cases which are encountered and which may be matched to the case base may be represented by records which may be matched to the relational data base. When a case is to be matched to the case base a search designation may be composed and applied so as to produce a search set of records which represent similar cases. One of these records may be chosen as the predictive record which represents the case which is the best match. When the record which represents the best match is chosen the predicted fields may represent the prescribed action for that case. For example in a help desk system the predicted fields may indicate a voice response message and a selection menu to be presented to the caller.

U.S. Pat. No. 5,587,897 discloses an optimization method comprising a step for inputting an objective function which includes a parameter to be optimized and is an object for searching an optimal solution, a required precision indicating a precision required in searching the optimal solution and a search region for searching the optimal solution for the object function to make that objective function into a convex function; a step for inputting said convex objective function to detect a search start point for starting a search of the optimal solution from said search region of the optimal solution, and a step for detecting the optimal solution based on the detected search start point.

DRAWINGS

The invention will be further described in connection with the illustrations which contain an apparatus overview, six flow charts and an example plot of practical results. More specifically, the Figures are as follows.

SUMMARY OF THE INVENTION

The approach used in the system of the invention is to apply case-based reasoning (CBR) to sensor prediction. The principle behind CBR is one of reuse of old problem solutions. The knowledge base of the CBR system is a collection or problem solving cases. Each case is composed of two distinct parts:

A problem description—the collection of features (symptoms) that characterize the problem The problem solution—a description of what the solution to the problem was and, optionally, how the solution was derived.

The principle behind CBR is that similar problems have similar solutions. Hence, in order to solve a new problem, where only a problem description exists, this new problem is compared to all existing problems via some domain specific similarity function. Once one or more similar, previously solved problems, i.e. cases, have been found, the solutions are reapplied to the new problem.

The system described here is unique in the way it applies CBR to the problem of sensor prediction in technical processes. The case base is built directly on top of the archive of sensor data in such a way that the cases within the case base and the actual sensor data are coupled. This means that the system can directly exploit the most up-to-date sensor data without any need for manual modification. In this way, the system responds to drift in the behavior of the technical process, as reflected by the sensor data.

The system matches the current state of the technical process, as reflected in the sensor data, with all past cases representing example previous states in order to extract the most similar previous state(s) of the technical process. A number of alternative previous states can be retrieved simultaneously for the current state and presented as possible alternative predictions to a human expert. There is a relatively high degree of flexibility in the retrieval of previous states; it can be based on a comparison across all 400+ sensors or on a small number of signature sensors selected by a user. The current state and each previous state can be graphically plotted. For example, because actual cement kiln data are re-used as the basis for the prediction, the results can be easily interpreted by a human expert.

The CBR approach has proved successful and robust in the cement kiln application. Experimental trials have shown that the system is capable of making accurate predictions of up to and beyond 1 hour into the future. Furthermore, experiments have verified that a CBR approach is capable of predicting both general trends, such as stable sensor values as well as rare events, such as global changes to the state of the cement oven triggered by a single event.

In the system, the cases are defined as partially virtual views of the data in the sensor data archive. Each sensor can be thought of as a time-stamped sequence of values. A single case represents a particular time-window, within the data for all sensors. There are two consecutive time periods within a single case's time window, namely:

a The Preceding Period—representing the sequence of sensor values to be used to match a previous case to a current situation in the technical process, e.g. cement kiln; and b The Projected Period—representing the state of the technical process, e.g. cement kiln. for a length of time immediately following the preceding period.

Another version of the invention, a number of more abstract features e.g. number of oscillations in the preceding period, are automatically extracted from the sensor data and included as part of the case description, in order to improve the accuracy of case matching.

In the terms of the earlier description of CBR, the preceding period represents the problem description for a case and the projected period represents the problem solution. The actual time span for preceding and projected periods is defined by system parameters and can be configured for a particular application.

The time-point that marks the boundary between preceding and projected periods will be referred to as the Case Time in this text. After a previous case has been retrieved for the current situation in a technical process, e.g. the process of the cement kiln, its case time will be synchronized to the latest recorded sensor value in order that its projected period can then be used as a prediction for the future behavior of the technical process.

In principle, a new case can be created in the case base for every time point at which a separate sensor value is recorded. In reality, this will lead to an excessive number of overlapping cases. In practice, because of the usually slow rate of change of state within a cement kiln, only one or two cases are typically required to characterize the behavior over a particular hour, though on exceptional occasions a much higher density of cases is required, e. g. when the behavior of the kiln is under-going a major change. In order to achieve best prediction performance, a probabilistic distribution of cases throughout the sensor data archive is employed. The probability of creating a case at a given time point depends on two factors: The period of time since the last case was created and a metric of the amount of information in the sensor values, e.g. degree of fluctuation, in the vicinity of the time point.

More cases tend to be created at time points where the behavior of the technical process, e.g. cement kiln, is most dynamic, while some cases within stable regions are still retained. This "intelligent" distribution. of cases within the data archive gives improved performance with respect to an even distribution of the same number of cases.

A typical application will contain several thousand previous cases. Despite the relatively lax constraints on the time required to generate a new prediction of the order of 1–2 minutes, reading individual sensor values from a database is still too slow. Therefore, some sensor data must be reproduced within the local memory of the system to facilitate case retrieval. This is referred to as the Case Index. In the system of the present invention, the case index represents the minimal amount of sensor information from the preceding period that is required to produce reliable retrieval of previous cases. The extraction of the appropriate case index is achieved via a fully automated optimisation technique, (described below). It is important to note, however, that the system can operate successfully, although sub-optimally, even without a Case Index, i.e. using all sensor information for case retrieval. Hence, the case base optimisation system can be seen as a process that is first used to improve system performance after the system has been in operation for some weeks and may be used as an off-line means of occasionally recalibrating the control system in response to gradual changes in the behavior of the technical process, e.g. the process of the cement kiln.

The goal of case-based optimisation is to minimize the amount of data replicated within the case base without reducing the quality of case retrieval. Data reduction means discarding irrelevant sensors for relevant sensors and determining the minimum time period of previous values of that sensor that reeds to be compared for an accurate retrieval. The reduction of data is important for several practical reasons, including the following:

Memory Usage is Reduced (Compression)—the amount of data that can be held in the working memory of the system without encountering high degrees of memory paging is bounded by the limitations of current computing hardware technology;

Increased Retrieval Speed—by comparing fewer sensor values per case, the retrieval of the most similar previous cases is increased; and Improved Prediction Quality—There are a number of reasons why reducing the amount of explicitly stored data per case increases the accuracy of the system. First, the limitations on the size of working memory effectively limits the number of cases that can be generated on top of a given data archive—i.e. it determines how sparsely cases are spread through the data archive. By reducing the amount of data per case, more cases can be created and hence the average time period between generated cases is reduced. This, in turn, leads to a greater prediction accuracy as, on average, a more exact time-alignment of previous cases to the current situation is possible. In addition, another benefit of the optimisation process is that it tends to eliminate those sensors which have the lowest information content, i.e. have high degrees of noise, or have highly redundant information with respect to other sensors. The elimination of irrelevant information generally improves retrieval accuracy with respect to the situation where all sensor values are used.

The case base optimisation starts with a training archive of sensor data from the technical process, e.g. the process of a cement kiln. On top of this data, a training case base and a test case base are generated, separate from one another, i.e. there is no overlap in the case time-span. Initially, the index for each case base contains all sensors and all values for each sensor within the preceding period.

Because the test cases are based on archived data, the actual behavior of each test case in its projected period is known. Therefore, for each test case, it is possible to predetermine which training cases have the most similar projected period, e.g. using a standard measurement of curve closeness, such as Root Mean Squared (RMS) error. Hence, the ideal retrieval results for each test case, i.e. an ordering across all training cases, can be generated.

For a given index, the actual retrieval ordering of training cases for a given test case is achieved via a comparison of the preceding periods. A general measure of the "fitness" of a given index description for a given training case base and test case base is given by the average closeness of the retrieval ordering of training cases per test case, with respect to the precomputed ideal orderings of training cases. This "fitness" is computed at each cycle in the case base optimisation process.

For a single optimisation cycle, a single sensor is randomly selected and the number of values for that sensor within the index of each case is halved. The resulting "fitness" of the case base is then determined. If there is no reduction in case base "fitness" then the reduction in the number of sensor values is accepted, else the failed number of values becomes a lower bound for the number of required values for that sensor. Thus, the optimisation converges via a strict "hill-climbing" approach—i.e. the amount of information in the sensors that is used is monotonically reduced while no degradation in retrieval quality is tolerated. Strict "hill-climbing" is implemented mainly to ensure efficiency of the optimisation process and better results may be obtained with a variation of the invention that uses a more global optimisation algorithm, such as simulated annealing.

The optimisation process continues until the required number of values for each sensor converges. Because of the strict "hill-climbing" nature of the algorithm, convergence is guaranteed. Irrelevant sensors will end up with zero required values.

Initial experiments on the cement kiln data reveal that roughly only 50% of all sensors need to be included within the case index. Importantly, the amount of information required for each remaining index sensor is highly variable. Most included sensors require only the most recent one or two values to be compared while a small number of key sensors require a high number (30→60) of values. From the initial experiments, an overall compression to only 5–10% of the initial set of all sensor values is achieved within the optimal case indicies. Effectively, this means 10–20 times more cases can be included within the case base for a given working memory capacity, hence increasing accuracy of the system. Accuracy is also increased through the elimination of noise.

Many CBR systems pre-structure their case memory to support rapid case retrieval, e.g. through the use of decision trees to segregate the underlying cases. However, for this invention, the massive amount of data stored in each case, coupled with the need for flexibility in case retrieval, e.g. the run-time selection of relevant sensors by a user, makes such pre-structuring of memory difficult. Hence, the implemented retrieval mechanism generally involves a linear search through all stored cases. A similarity function computes a normalized similarity value for each stored case, with respect to the current state of the technical process, e.g. cement kiln, and with respect to the sensors selected as relevant by a user. The result of retrieval is an imposed, similarity-based ordering across all stored cases. A more efficient variation of the invention is to imploy this ordering just for a limited number, e.g. 20, of the best previous cases.

The key to retrieval is the similarity function used. The similarity function operates upon the case index. The similarity of the current situation to a stored case is equal to the normalized sum of the similarities of each pair of corresponding index sensors. The similarity in the value sets for two matched sensors can be computed by standard mathematical functions, e.g. RMS.

Another version of the invention, sensors are represented not just by their value sets but also by features extracted from these value sets, e.g. number of fluctuations in the preceding period. Such features can also be compared using specialized similarity functions and combined with the similarity between value sets to give an overall similarity measure between two matched sensors. The inclusion of such extracted sensor features was shown to improve the overall accuracy of the retrieval mechanism.

DETAILED DESCRIPTION OF THE INVENTION

Figure 1:
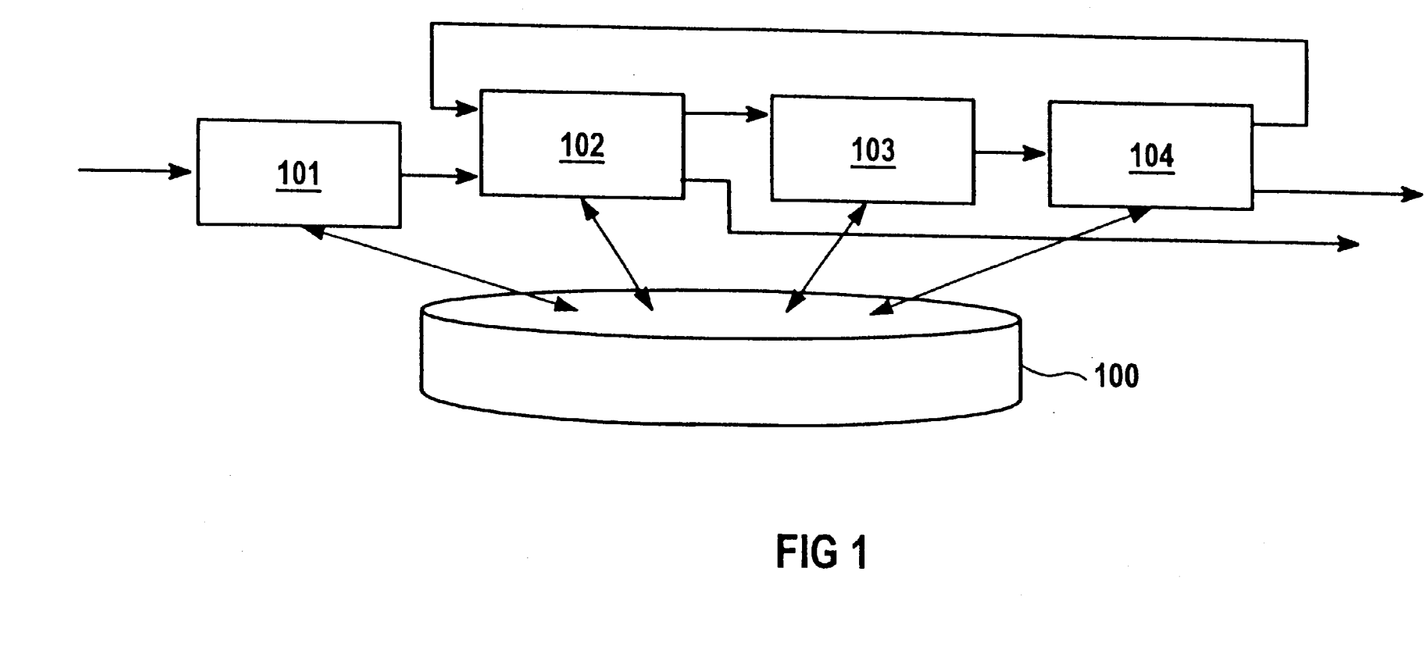
FIG. 1 is an apparatus for case base optimisation.

In FIG. 1, the Case Base Optimisation Framework is shown and includes the Case Base 100, a Test Generator 101, an Optimiser 102, an Evaluator 103 and an Acceptor 104. The units 101 to 104 are interactively coupled to the Case Base 100. The Test Generator 101 triggers the Optimiser 102, which creates signals. The Optimiser 102 activates the Evaluator 103 and Acceptor 104. Signals from Acceptor 104 are channeled back to the Optimiser 102 in order to trigger cyclic activation of the devices.

Figure 2:
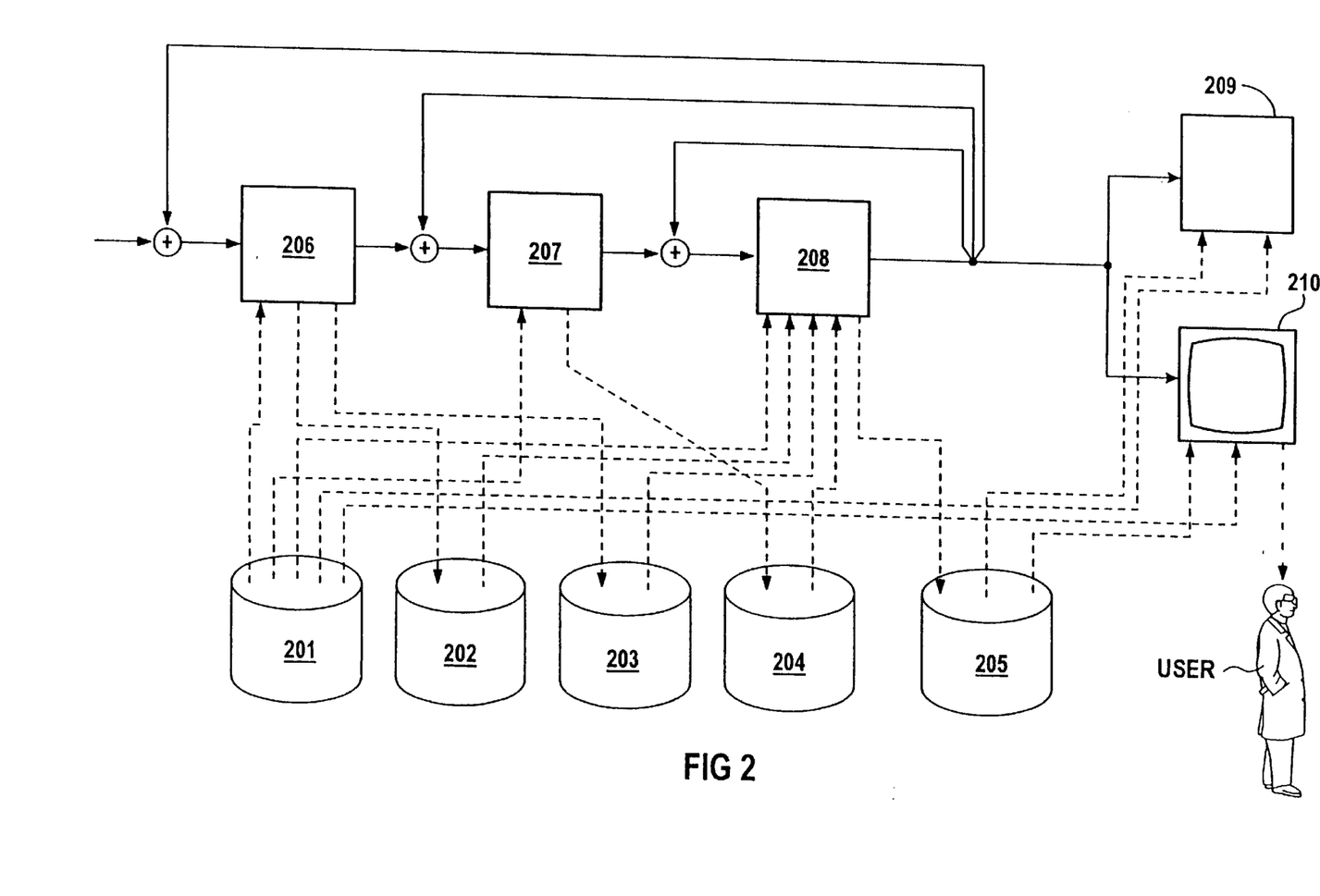
FIG. 2 is the top level flow of the method executed in the apparatus of FIG. 1.

The FIGS. 2 to 7 includes a series of flow diagrams that define the main component activities and data resources that define the behavior of the new system. For example, FIG. 2 shows the top-level architecture of the claimed method. It comprises:

- a database 201 containing all sensor data;
- a database 202 that contains groupings (clusters) of the sensors;
- a database 203 that contains the generic description (index) of each case in terms of the required sensor values;
- a database 204 that contains all individual cases used by the prediction and control system;
- a database 205 that contains the temporary collection of retrieved cases that match the current state of the cement kiln;
- a training unit 206 that generates databases 202 and 203, based on the sensor data in 201;
- a case extraction unit 207 that extracts the case base 204 used by the control system from the sensor data 201;
- a prediction unit 208 that generates a set of predictions, namely database 205, based on the information stored in databases 201, 202, 203 and 204;
- a unit 209 that uses the predictions stored in database 205 along with the sensor data in 201 as the basis for automated control of the cement kiln;
- a unit 210 that uses the predictions stored in database 205 along with the sensor data in 201 as the basis of a graphical display of the predictions in order to assist a human controller.

FIG. 2 represents the top level behavior of the new control system. What is noteworthy is that the system in normal operation will have three possible cycles:

- The long-term maintenance cycle may be carried out once during the installation of the system, then, rarely, if at all, completely retrain the system in response to major changes in the underlying technical process. Amongst other things, the system will learn a new optimal case index;
- The medium-term maintenance cycle allows new cases to be added to the case base but does not change the definition of a case index. This cycle may be, for example, carried out daily to keep the case base up to date; and
- The normal prediction cycle represents the normal usage of the new system. This cycle may be performed as regularly as every minute in order to keep the prediction generated by the system up to date.

The results of the system are represented as a similarity ordered sequence of previous cases. This provides the basic information that allows the most relevant old sensor values to be extracted from the underlying data base of the technical process. Extracted data can either be presented to a human expert as an aid to manual process control, or as the input to an automated control system to guide computer-based decisions.

Figure 3:
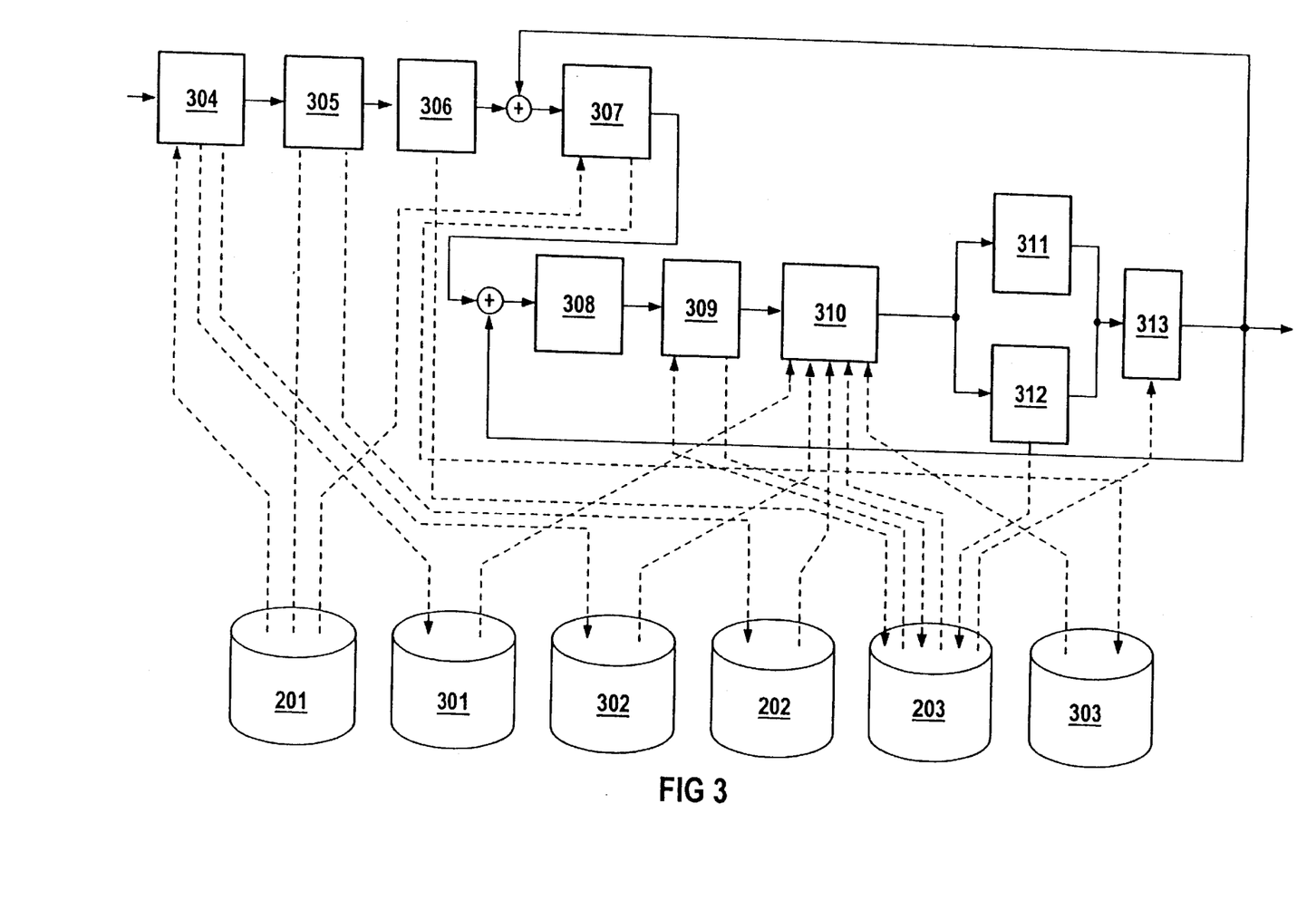
FIG. 3 is the training flow.

FIG. 3 shows the internal architecture of the training unit 206 of FIG. 2. It comprises:

- a database 301 that is a temporary case base used to evaluate predictions during the training period;
- a database 302 that is a second temporary case base of cases for which predictions must be made during the training :period;
- a database 303 that stores the best possible prediction for each test case extracted from the sensor data or database 201 of FIG. 2;
- a case extraction unit 304, which is a variation of unit 207 of FIG. 2, that separates the sensor data stored database 201 of FIG. 2 in order to create the two case bases 301 and 302;
- a unit 305 that generates the groups of sensors stored in database 202 of FIG. 2, based on correlated trends in the sensor values stored in database 201;
- a unit 306 that creates the initial state of the generic case index stored in database 203 of FIG. 2, in terms of the maximum number of sensor values that should be considered in a single case.
- a unit 307 that evaluates the sensor data of 201 in order to determine the best possible predictions of each test case, stored in database 303;
- a unit 308 that selects a sensor at random and a unit 309 that temporarily reduces the number of values of the corresponding sensor that are included within the generic case index stored in 203;
- an evaluation unit 310 that determines if the previous reduction in sensor values by unit 309 led to an improved prediction performance with respect to the ideal results;
- a unit 311 that makes permanent the last change made by 309 and stored in database 303 in the case of a positive evaluation by unit 310, and a unit 312 that reverses the last change made by unit 309 in the case of a negative evaluation by unit 310; and
- a unit 313 that determines when the training period should terminate—i.e. no further improvement in the generic case index of database 203 are possible.

FIG. 3 represents the relatively complex internal behavior the training activity of the present invention. From the raw sensor data, a test and training case base are constructed along with the set of sensor clusters. The system then interatively refines the case index so that a minimal amount of sensor data is included in the case index without producing a degradation in retrieval accuracy.

Figure 4:
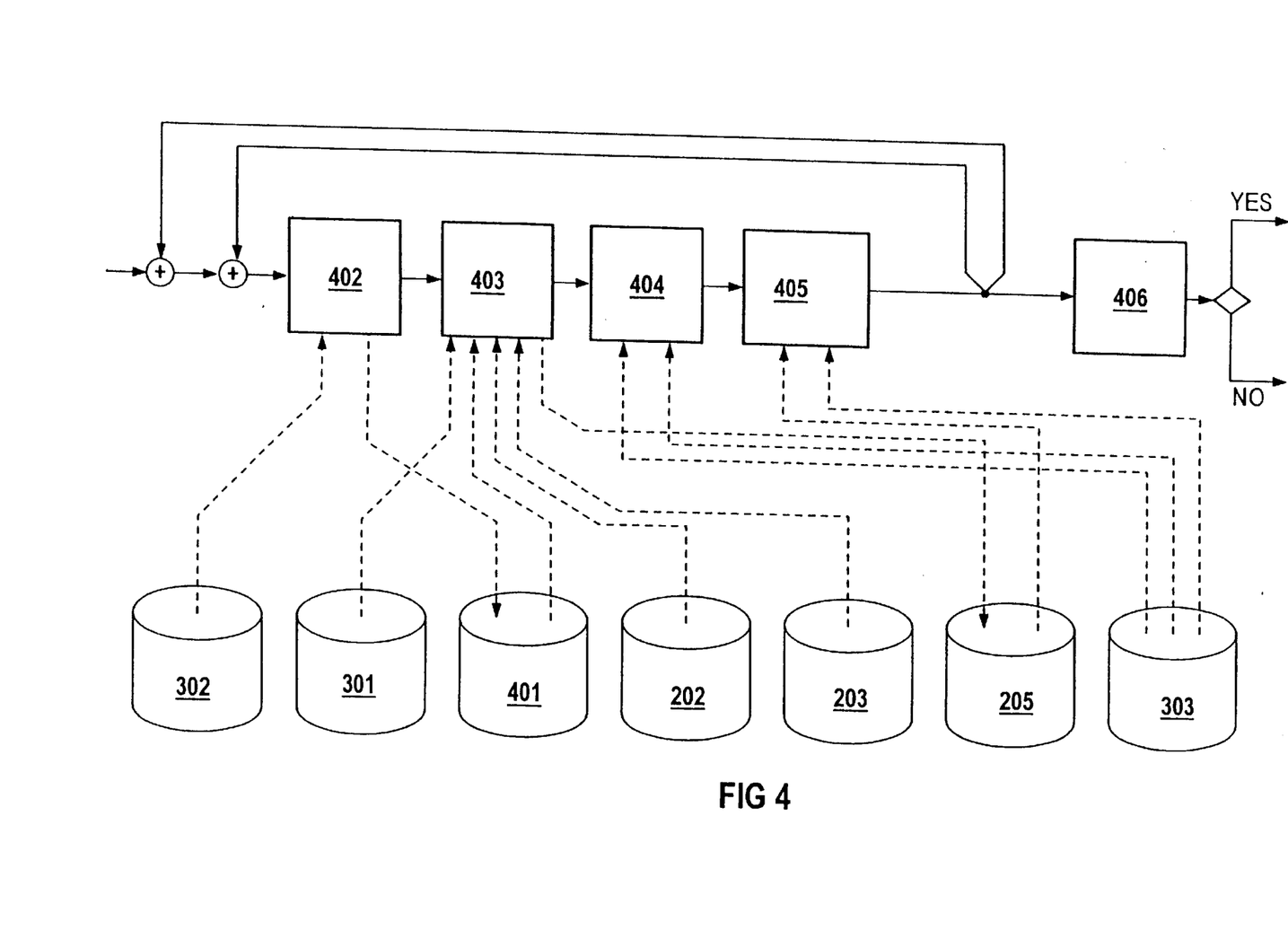
FIG. 4 is the evaluation flow.

The heart of the training process is the evaluation activity shown in FIG. 4. FIG. 4 shows the internal architecture of the central evaluation unit 310 of FIG. 3 of the training unit 206 of FIG. 2. It further comprises:

- a database 401 that temporarily represents the current cases selected from the test case base 302;
- a Unit 402 that selects each of the test cases stored in 302 of FIG. 3 in turn and places them in 401;
- a unit 403 that carries out a case retrieval from the training cases stored in 301, based on the current test case in 401 and on the current state of the generic case index in 203, in order to create the temporary retrieval results stored in 205 of FIG. 2;
- a unit 404 that determines which of the ideal results stored in 303 of FIG. 3 are applicable for the test case currently stored in 401;
- a unit 405 that computes a numeric measure of the difference in the prediction made for the test case of 401 by the corresponding retrieval results of database 205 of FIG. 2, with respect to the corresponding ideal results in database 303 of FIG. 3; and
- a unit 406 that converts the combined numeric evaluation across all test cases of 302 into a boolean decision as to whether or not the evaluation was positive.

The evaluation takes each case of the test case base in turn and performs a retrieval from the training case base. The resulting retrieval ordering is compared to a precomputed ideal ordering of training cases for the test case. A numerical value for the degree of correspondence of the two orderings is computed and added to a combined evaluation value for the whole test case.

Figure 5:
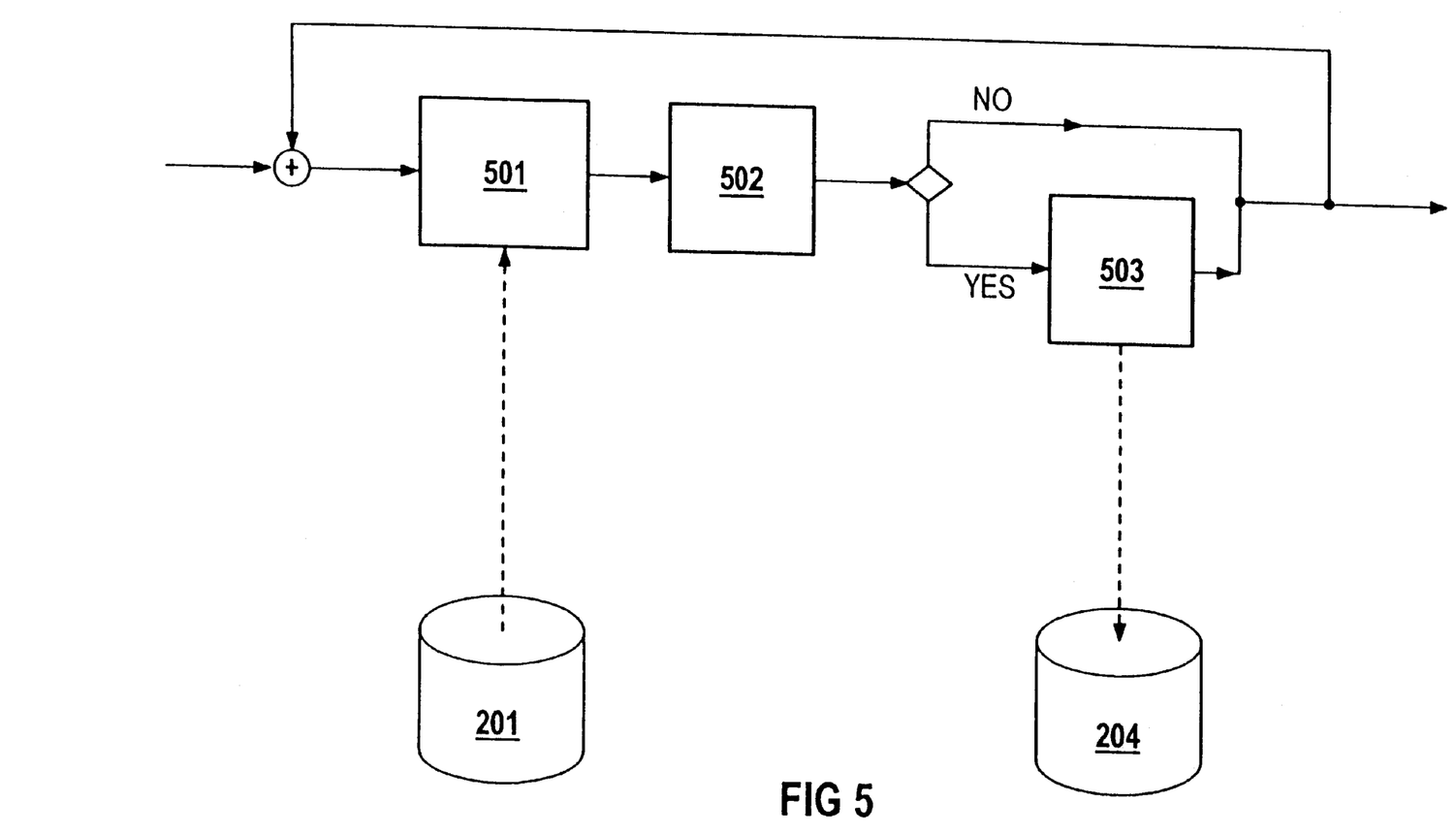
FIG. 5 is the extract case base flow.

FIG. 5 shows the internal architecture of the unit 207, see also 304, used to extract a case base in the top level architecture. It comprises:

- a unit 501 that computes a numeric "interest" value for each time point of the sensor values stored in database 201;
- a unit 502 that determines whether the interest level of each time point exceeds a given threshold; and
- a unit 503 that is used when unit 502 determines that the threshold has been exceeded in order to create a new case and to insert the case into the database 204;

FIG. 5 represents the way in which a case base is extracted from the database of sensor values for the technical process. The process iterates from a start time to an end time and generates a case at every time point that is defined as "interesting" with respect to a computed metric. Normally, the extraction will iterate from the first stored sensor values up to the most recent data. For the generating of training and test case bases, the data needs to be segregated into disjoint test and training time periods.

Figure 6:
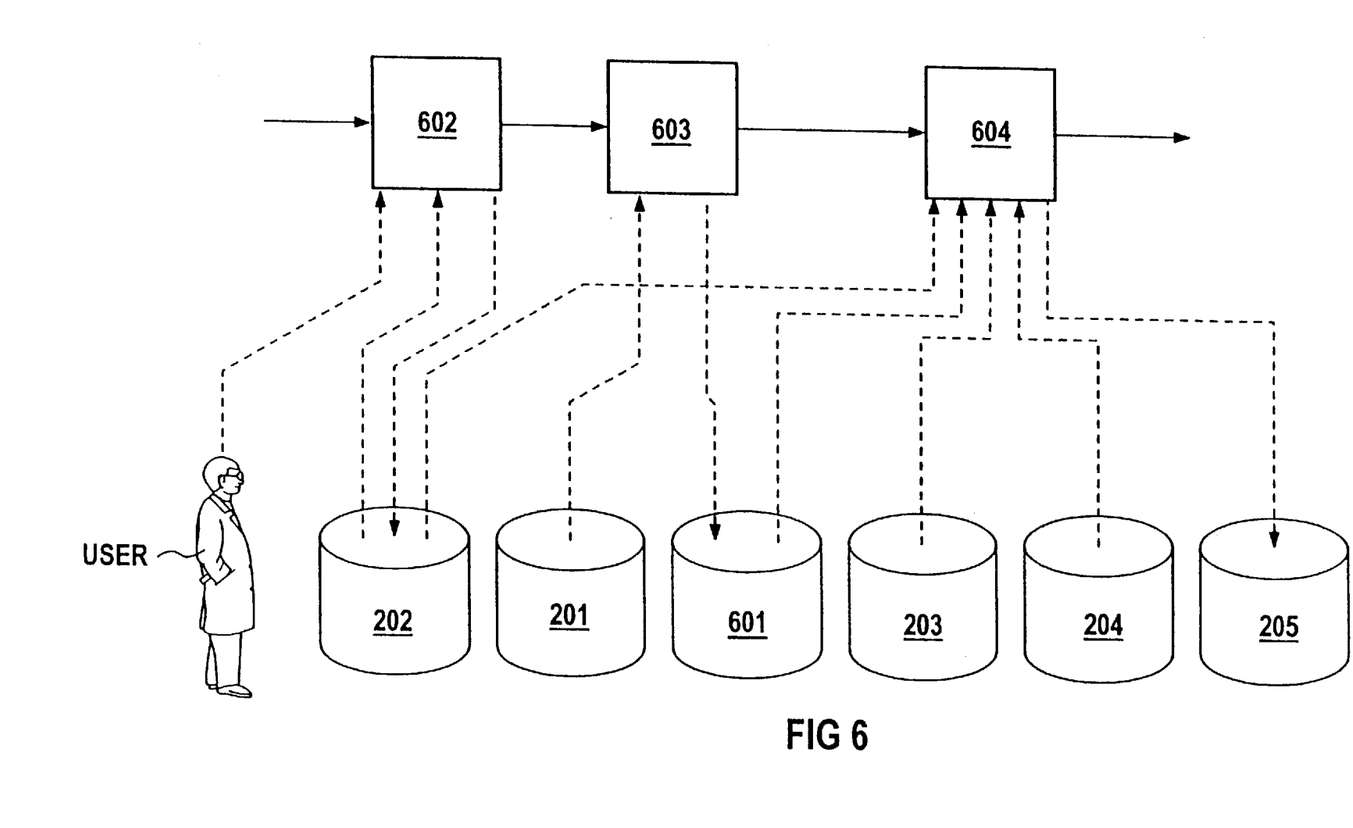
FIG. 6 is the generate sensor predictions flow.

FIG. 6 shows the internal architecture of the unit 208 of FIG. 2 used to make sensor value predictions. It comprises:

- a database 601 that represents a new case for which a prediction must be made;
- a unit 602 that allows a subset of all sensors to be determined as relevant for retrieval, based on the sensor groupings stored in database 202;
- a unit 603 that generates a new case in database 601, representing the most recent sensor values stored in database 201; and
- a retrieval unit 604, that carries out case retrieval for the new case in database 601 from the case base 204 based on the information stored in databases 202, 203. The results are stored in the database 205.

FIG. 6 represents the internal behavior of the main activity to predict future sensor values. The prediction process corresponds to the process of case retrieval. The only addition is that the user may first interact with the system in order to select which sensors are currently of interest. Only these sensors are then considered in the retrieval of relevant past cases.

Figure 7:
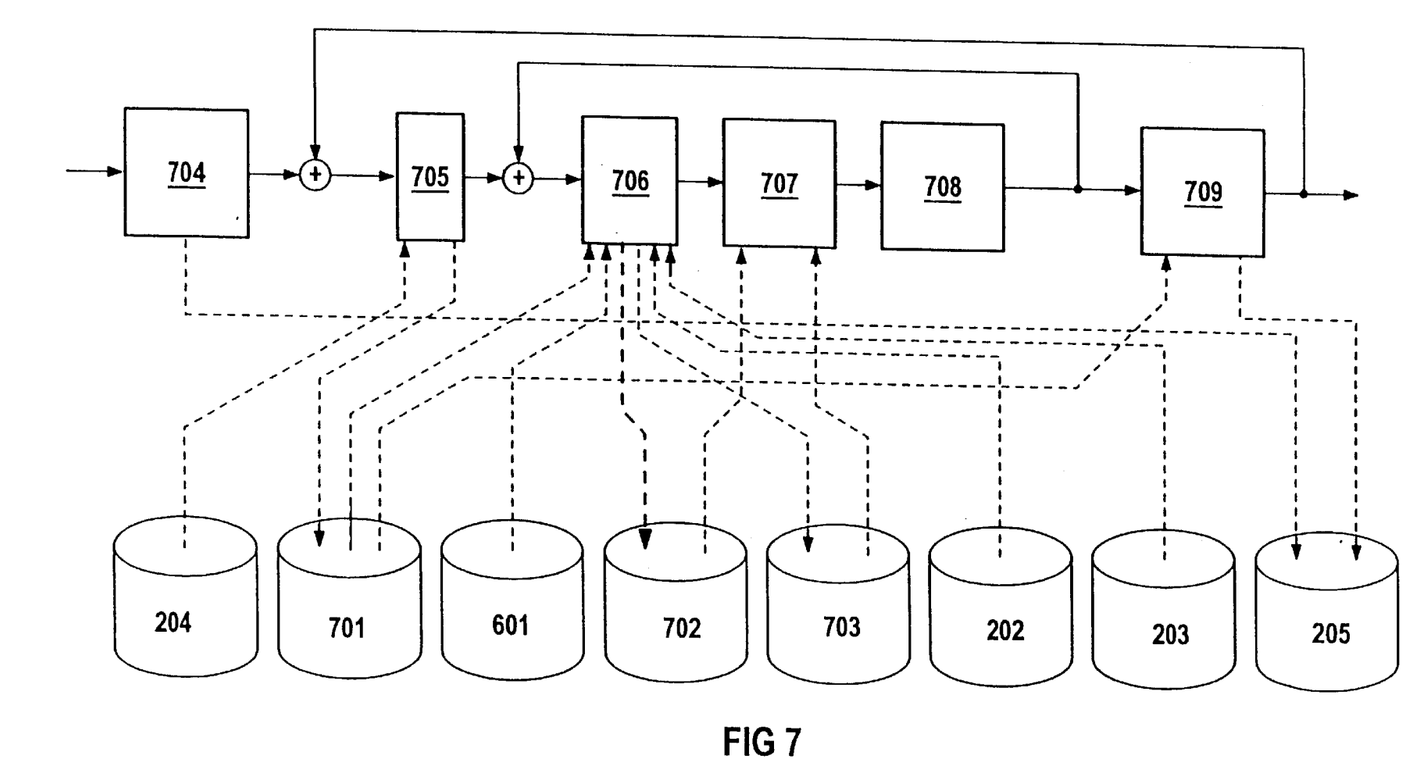
FIG. 7 is the case retrieval flow.

FIG. 7 shows the internal architecture of the retrieval unit 604 of FIG. 6. It comprises:

- a database 701 in which each stored case is temporarily stored during the retrieval process;
- a database 702 that represents the values for a selected sensor of the old case stored in database 701;
- a database 703 that represents the values for a selected sensor of the new case stored in database 601 of FIG. 6;
- a unit 704 that clears the retrieval results stored in database 205 prior to the new retrieval process;
- a unit 705 that selects each of the cases stored in database 204 in turn and places the old case in database 701;
- a unit 706 that selects each corresponding pair of sensors from the old case of database 701 and new case of database 601 in turn, taking into account the selected sensor groupings in 202, and then extracts the appropriate number of values in accordance with the generic case index stored in database 203, storing the sensor value sequences in databases 702 and 703 respectively;
- a unit 707 that computes a numeric similarity value for the correspondence between the sensor value sequences stored in databases 702 and 703;
- a unit 708 that adds the results generated by unit 707 to an internal case similarity value; and
- a unit 709 that adds an old case from database 701 to the new case retrieval results stored in database 203, ensuring that the old cases are ordered with respect to descending similarity to the new case in database 601.

FIG. 7 represents the case retrieval process. As shown, this involves a linear search through all stored cases in a given case base. Each of these cases is compared to a given new case. The similarity between an old and new case is based on the summation of similarities of pairs of sensors between the two cases. The case index specifies which sensors are worthy of consideration during retrieval, and how many values for each pair of sensors need to be compared for a reliable similarity measure.

As stated above, the result of retrieval is an ordered list or previous cases for the technical process. The one or more most similar cases provide the basis on which an evaluation of the most likely future state of the technical process can be made and, consequently, the appropriate control decisions made. While, in principle, the novel system could act as a part of a fully automated control system, the main mode of operation is in collaboration with a human expert—the invented control system presents the expert with the retrieved cases in a clearly understandable format, i.e. a graphical lot, and the human expert makes the informed control decisions. This frees the human expert from the time consuming, error-prone and laborious task of trying to locate the most similar previous states of the technical process, e.g. the process of the cement kiln, as stored in the data archive, while enabling their intuition and understanding of the technical process to be best exploited.

Figure 8:
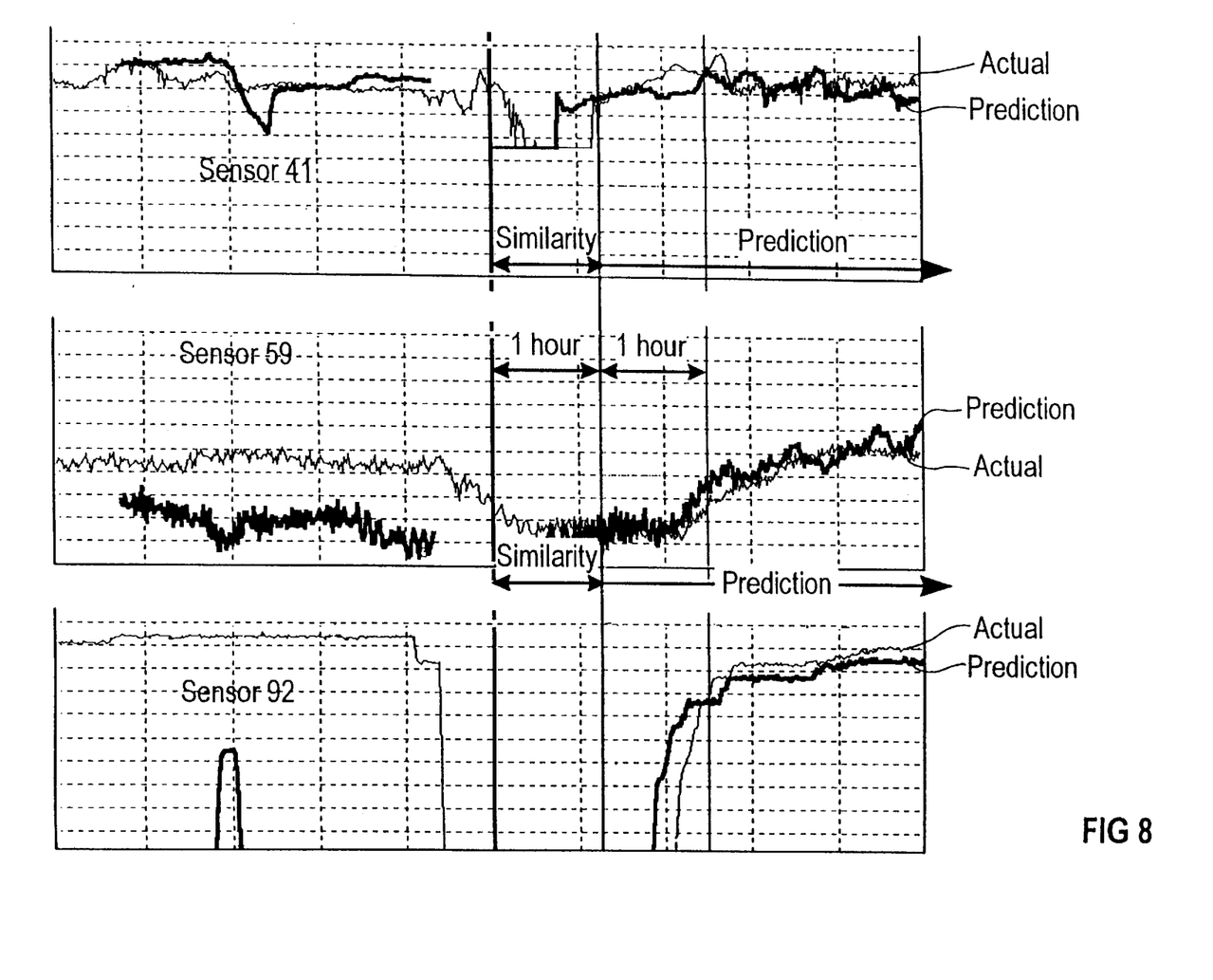
FIG. 8 is a diagram with results of the inventive method and apparatus.

An example of the graphical display is presented in FIG. 8.

In reality, the user is not restricted to just looking at the time periods defined by the scope of a case. The system includes a general-purpose viewer for browsing the database of the technical process. The preceding and projected periods of a retrieved case are super-imposed as vertical lines onto a more continuous plot of sensor values. Thus, the browser allows a much longer time period into the past to be viewed than defined by a case's preceding period, in turn, enabling a more complete understanding of the similarity between the current situation and a retrieved case. It is also possible to view beyond the projected period for the previous case to get a longer prediction for the future behavior of the cement kiln. While this is not generally recommended, as the accuracy of prediction generally decreases with distance into the future, the present system is often capable of predicting long-term trends in a technical process. For example, the system generally makes predictions concerning the technical process that remain valid for longer than the default I hour projection periods of cases.

The "Results Plot" of FIG. 8 are a typical example of the results of the present system, during evaluation period. FIG. 8 shows, on the right-hand side, the prediction made for three selected sensors, (sensor 41, sensor 59 and sensor 92) for an evaluation case selected by a human. expert. The actual data is plotted alongside the predicted data in order to enable comparison—in normal operation, in contrast to the evaluation phase, beyond the similarity time period, only predicted values will be available and hence, displayed.

FIG. 8 illustrates a number of key characteristics of the present system including:

Predictions often remain valid longer than the required 1 hour prediction period—the example only begins to degrade in quality after about 3 hours into the future Time alignment between prediction and actual behavior is not always exact—e.g. approximately 10 minutes difference in the predicted and actual rising edge of sensor 92 can clearly be observed The system successfully captures relationships between sensors—for example, the successful prediction of the rising edge of sensor 92 cannot be attributed to similarity in this sensor alone, as the preceding values for sensor 92 are all zero. The similarity in the two situations must stem from the other sensors, either sensor 41 or 53, respectively from one or more of the undisplayed sensors.

The system is a unique attempt at applying CBR technology to the task of sensor prediction within a technical process, specifically a cement kiln. The advantages that the approach provides are as follows:

Predictions are based on real-life examples taken from the history of the cement kiln. Therefore, the predictions can be inspected and understood by a domain expert;

The system is directly coupled to the underlying sensor data in the data archive, hence the system automatically responds to any drift in the cement kiln behavior;

The system requires no general domain model to perform predictions, therefore installation and maintenance costs are low;

The system is able to predict general trends and exceptional events;

The system provides a set of alternative predictions for each new situation. The CBR assumption that similar problems require similar solutions has proved valid for the cement kiln application. Retrieval of similar situations leads to predictions that generally remain valid for a long period of time, e.g. more than one hour, and capture interesting details within the more general trends of the sensors.

Not only is the system a general innovation in its usage of CBR for this type of problem, a number of more technical innovations have been achieved in order to deal with the massive amount of raw data involved, for example:

The definition of semi-virtual cases as time-spanned views of the underlying sensor data; and A self-optimisation algorithm for the case base so as to extract the minimal amount of required index information.

The potential for this technology is very high. The cement kiln application itself is open to future extension. Within the underlying data archive are also recorded the control decisions made by the human experts monitoring the cement kiln. Therefore, in retrieving a previous case, the system may not only provide the means for predicting future kiln behavior, but also for reusing control decisions. This may provide the basis for a more automated control system with cement factories. Alternatively, the system could be used as a training system for new human controllers, allowing them to investigate how existing experts actually responded in various situations.

Moreover, within the underlying data archive, time-stamped quality metrics are also routinely stored. For example, samples of the output cement clinker are routinely taken and tested in a laboratory. The results of these tests allow classification to be made of how successfully the cement kiln had performed at any given time. Such evaluations could be incorporated into the case retrieval mechanism to classify cases as "good" or "bad". The system could, therefore, guide a user towards reusing successful control decisions while warning against the reuse of control decisions that had proven unsuccessful in the past. This should lead to an overall improvement in the performance of the cement kiln.

The design of the system is in no way specialized to the needs of the cement kiln application. A highly generic model of time-trended sensor data is used for the definition of cases. Therefore, the system could easily be applied to the prediction of sensor data in other technical processes than those relevant to cement kilns. The conditions under which the system is most likely to be the best implementation choice are those wherein:

Sensor data is routine stored in a machine-readable data archive;

The complexity of the system makes model-based techniques too expensive or practically impossible;

The time constraints on the generation of a prediction are not too long.—The time taken to make a prediction must be significantly less than the time period for which that prediction remains valid. Assuming a is minute monitoring cycle of a cement kiln, the system is currently designed to make a prediction in 1–2 minutes. This speed will depend on the available computing hardware, e.g. size of memory, and on the size and complexity of the data stored in the data archive. The system is currently not, however, suitable for applications that require very rapid (<<1 second) response; and The interpretability of predictions by a human expert is a key factor. Therefore c.f. neural networks, etc. are used.

The application of the CBR approach to other types of time-trended information, other than sensor-based data, should also be possible. Examples of such information include: share-price trends, market trends, user demands within an electricity supply network, etc.

We claim:

1. A method for control of a technical process which generates a plurality of sensor values which are recorded and stored in a sensor data archive, comprising cases generated from recorded sensor data representing a behavior of the technical process; extracting a case from the sensor data archive containing at least a subset of all cases generated previously; generating a new case representing a current state of the technical process for which a prediction is to be made; comparing the new case with previous cases as a basis of prediction for future behavior of the technical process; further comprising recording time-stamped sequences of sensor values and storing this data in the sensor data archive; generating cases representing a time-interval within the data archive for all sensor values which is defined by a case time marking the boundary between a preceding and a consecutive projected period of said time-interval; determining a case similarity value for each previous case to the new case by comparing sensor value sequences of preceding periods of said new case and said previous cases; carrying out case retrieval by ordering previous cases with respect to descending similarity to the new case; synchronizing a case time of a one or more most similar case to a latest recorded sensor value of a new case; and using a projected period of the most similar case as a prediction for the future behavior of the technical process.

2. The method according to claim 1, further comprising displaying the prediction for the future behavior of the technical process to provide a basis on which a control decision can be made by a human expert.

3. The method according to claim 1, further comprising selecting a relevant subset of all sensors which are of interest and using only value sequences of relevant sensors for determining a case similarity value.

4. The method according to claim 3, wherein determination of a case similarity value further comprises selecting a corresponding pair of sensors from the previous case and the new case; extracting a number of sensor values in accordance with a case index, said case index specifying which sensors are worthy of consideration during case retrieval and how many values for each pair of sensors need to be compared for a reliable similarity determination; computing a numeric similarity value to determine a correspondence between the sensor value sequences of a selected pair of sensors according to the case index; and summing up numeric similarity values for all pairs of sensors according to the case index and/or a case similarity value.

5. The method according to claim 4, further comprising extraction of a case base from the sensor data archive comprising computing a numeric interest value for each time point of the sensor values; determining whether the numeric interest value of each time point exceeds a given threshold; creating a case when the threshold has been exceeded; and inserting the case into the case base.

6. The method according to claim 4, further comprising extraction of a case base from the sensor data archive comprising employing a probabilistic distribution of cases throughout the sensor data archive, wherein a probability of creating a case at a given time point depends on a period of time since a last case was created, and a metric of an amount of information in the sensor values in a vicinity of said time point.

7. The method according to claims 4, 5 or 6, further comprising extraction of a case index comprising generating on top of the sensor data archive a training case base used to evaluate predictions, and a test case base for which predictions must be made, said training and test case base being disjointed from one another; creating a case index, containing all sensors and substantially all values for each sensor within the preceding periods of the cases; determining an ideal retrieval result representing a best possible prediction for each test case on a basis of known behavior of the test cases in their projected periods; refining the case index by selecting a sensor; reducing the case index's of values for said sensor; determining if the reduction in sensor values leads to an improved retrieval result with respect to the ideal retrieval result; accepting the reduced number of sensor values in the case index, if the determination is positive; and reversing said reduction if the determination is not positive.

8. The method according to claim 7, wherein determining whether a reduction in.sensor values leads to an improved retrieval result comprises selecting a test case of the test case base; carrying out a case retrieval from the training case base based on the test case and case index and creating thereby an actual retrieval result; computing a numeric value for a degree of correspondence of an actual retrieval result with respect to an ideal retrieval result; adding numeric values of all test cases to a combined evaluation value; and converting the combined evaluation value into a decision as to whether an evaluation is positive.

9. The method according to claim 8, wherein the extraction of a case index is carried out in a long-term maintenance cycle; the extraction of a case base is carried out in a medium-term maintenance cycle; and the prediction for the future behavior of the technical process is performed in a normal prediction cycle.

10. The method according to claim 8, wherein the long-term maintenance cycle is once in the installation and rarely thereafter; the medium-term maintenance cycle is daily; and the normal prediction cycle is as regular as every minute.

11. An apparatus for implementing the method according to claim 1, comprising a data base containing substantially all sensor data, a data base containing all individual cases used by a prediction and control system; a prediction unit that generates a set of predictions; a unit that generates a new case; and a retrieval unit that determines case similarity values and carries out case retrieval.

12. The apparatus according to claim 11, further comprising a unit that uses predictions as a basis of a graphical display of the predictions in order to assist a human controller.

13. The apparatus according to claims 11 or 12, further comprising a unit that allows a subset of all sensor data to be determined as relevant for retrieval.

14. The apparatus according to claim 13, further comprising a unit that selects each corresponding pair of sensor data from a previous and new case and then extracts an appropriate number of values in accordance with a case index; a unit that computes a numeric similarity value; and a unit that adds a result of unit to a case similarity value.

15. The apparatus according to claim 14, further comprising a unit that extracts the case base from the sensor data; said case extraction unit comprising a unit that computes a numeric interest value for each time point of the sensor data archive; a unit that determines whether the interest value of each time point exceeds a given threshold; and a unit that creates a case when the threshold has been exceeded and that inserts said case into the case base.

16. The apparatus according to claim 15, further comprising a training unit for extracting a case index; said training unit comprising a training case base and a test case base; a unit that creates an initial state of the case index; a unit that determines a best possible prediction of each test case; a unit that selects a sensor; a unit that reduces a number of values of a corresponding sensor that are included in the case index; an evaluation unit that determines if said reduction in sensor values leads to an improvement in prediction performance with respect to a best possible prediction; a unit that makes said reduction permanent in case of a positive evaluation by unit; and a unit that reverses said reduction in case of a negative evaluation.

17. The apparatus according to claim 16, further comprising a unit that selects each of the test cases; a unit that carries out a case retrieval to create an actual retrieval result; a unit that computes a numeric measure of a difference in a prediction by an actual retrieval result with respect to an ideal retrieval result; and a unit that converts a combined numeric evaluation into a decision as to whether or not an evaluation was positive.

18. The method according to claim 1, wherein the technical process is cement kiln.

* * * * *